United States Patent
Fischer (10) Patent No.: US 8,616,558 B2
(45) Date of Patent: Dec. 31, 2013

(54) TAPERED INTERLOCK RETENTION SYSTEM FOR FOAM OVERLAYS

(75) Inventor: David R. Fischer, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1397 days.

(21) Appl. No.: 12/061,686

(22) Filed: Apr. 3, 2008

(65) Prior Publication Data

US 2009/0250968 A1   Oct. 8, 2009

(51) Int. Cl.
*F16J 15/02* (2006.01)

(52) U.S. Cl.
USPC ....... 277/644; 296/146.11; 403/344; 403/381

(58) Field of Classification Search
USPC ......... 277/626, 607, 644; 296/146.11; 16/2.1, 16/2.2, 2.3, 82, 86 A, 86 R; 403/365, 367, 403/372, 344, 381
See application file for complete search history.

(56) References Cited

U.S. PATENT DOCUMENTS

| | | | | | |
|---|---|---|---|---|---|
| 2,464,653 | A | * | 3/1949 | Phipps | 277/607 |
| 2,762,117 | A | * | 9/1956 | Houck | 16/2.1 |
| 5,396,963 | A | * | 3/1995 | Curry | 403/381 |
| 5,727,287 | A | | 3/1998 | Hosken et al. | |
| 6,086,327 | A | * | 7/2000 | Mack et al. | 415/160 |
| 6,237,190 | B1 | | 5/2001 | Grumm et al. | |
| 6,446,305 | B1 | * | 9/2002 | Kneeland | 16/82 |
| 6,564,425 | B2 | * | 5/2003 | Audisio | 16/86 B |
| 7,458,726 | B2 | * | 12/2008 | Seilheimer | 384/276 |

FOREIGN PATENT DOCUMENTS

JP    9177410    7/1997

* cited by examiner

*Primary Examiner* — Michael P Ferguson (57) ABSTRACT

An overlay component (such as a seal) is provided for mounting to an elongated vehicle structure (such as a door check link) without passing the overlay over the end of the structure. The overlay component has a first body section and a second body section comprised of resilient material. The first body section has a first structure receiving portion and a first interlocking portion. The second body section has a second interlocking portion complementary with the first interlocking portion. The first and second interlocking portions resiliently deform as they are interlocked while the elongated vehicle structure is being received by the first structure receiving portion, thereby retaining the overlay component on the elongated vehicle structure without adhesives or fasteners.

16 Claims, 9 Drawing Sheets

TAPERED INTERLOCK RETENTION SYSTEM FOR FOAM OVERLAYS

BACKGROUND OF INVENTION

The present invention relates generally to foam overlays applied to elongated structural components in motor vehicles, and more specifically to a door check link seal embodied as a foam overlay that is installed without adhesives or separate fasteners.

The assembly of a motor vehicle is a complex process involving the coordination of parts installation and various treatments and coatings applied at various stages of assembly. Typical early steps in the assembly process include joining metal frame and body parts. Some component parts of the final vehicle such as foam or rubber parts cannot withstand environmental conditions occurring during the processing of the frame and body. For example, the painting process requires passing the frame and body parts through an oven where the elevated temperatures would destroy foam or rubber materials.

Foam or rubber materials are often used for various overlay components that are applied over another structure. These soft overlays may include gaskets, seals, sleeves, liners, collars, and sheathings, for example. Another assembly problem arises when the structure to be overlaid is an elongated structure that has no accessible end after it has been assembled to the vehicle. Without an accessible end, the overlay cannot be passed over the end for insertion on the elongated structure. An example is a door check link which is connected on one side to a door frame or hinge and on the other side to the inside of a door. The check link passes through a hole in the door and moves in and out within the hole during opening and closing of the door. The hole must be big enough to accommodate a changing angle of the door check link during operation. The open hole can have the undesirable side effect of allowing outside noise to enter the passenger cabin when the vehicle is driven. Therefore, a seal is normally applied on the door check link which substantially seals off the hole when the door is in its closed position. If a soft foam or rubber material is used for the seal, then it cannot be installed until after the door check link has been attached at both ends, otherwise the seal would be damaged in the paint oven. Thus, a two piece seal is conventionally installed onto the door check link using adhesives or other fasteners. It would be desirable to install the seal without use of adhesives or additional fasteners.

SUMMARY OF INVENTION

The present invention has the advantage of applying an overlay such as a seal or collar over an elongated structure such as a door check link without passing the overlay over the end of the structure and without adhesives or fasteners.

In one aspect of the invention, an overlay component is provided for mounting to an elongated vehicle structure after assembly of the vehicle structure onto a vehicle such that it has no open accessible end, wherein the vehicle structure is subject to environmental conditions during or after assembly to the vehicle that would otherwise destroy the overlay component so that the overlay component cannot be mounted to the vehicle structure prior to its assemble onto the vehicle. The overlay component has a first body section and a second body section. The first body section is comprised of a resilient material and has a first structure receiving portion and a first interlocking portion. The first interlocking portion has a first projection extending along a first axis and a first receptacle extending along a second axis. The first projection has a first cross-sectional profile perpendicular with the first axis which is greater at a distal end toward the second body section than at a proximal end. The first receptacle has a second cross-sectional profile perpendicular with the second axis which is lesser at a distal end toward the second body section than at a proximal end. The second body section is comprised of a resilient material and has a second interlocking portion having a second projection extending along the second axis and a second receptacle extending along the first axis. The second projection has a third cross-sectional profile perpendicular with the second axis which is complementary with the second cross-sectional profile of the first receptacle. The second receptacle has a fourth cross-sectional profile perpendicular with the first axis which is complementary with the first cross-sectional profile of the first projection. The first and second projections resiliently deform for insertion into the second and first receptacles, respectively, while the elongated vehicle structure is received by the first structure receiving portion, thereby retaining the overlay component on the elongated vehicle structure without adhesives or fasteners.

DETAILED DESCRIPTION

Figure 1:
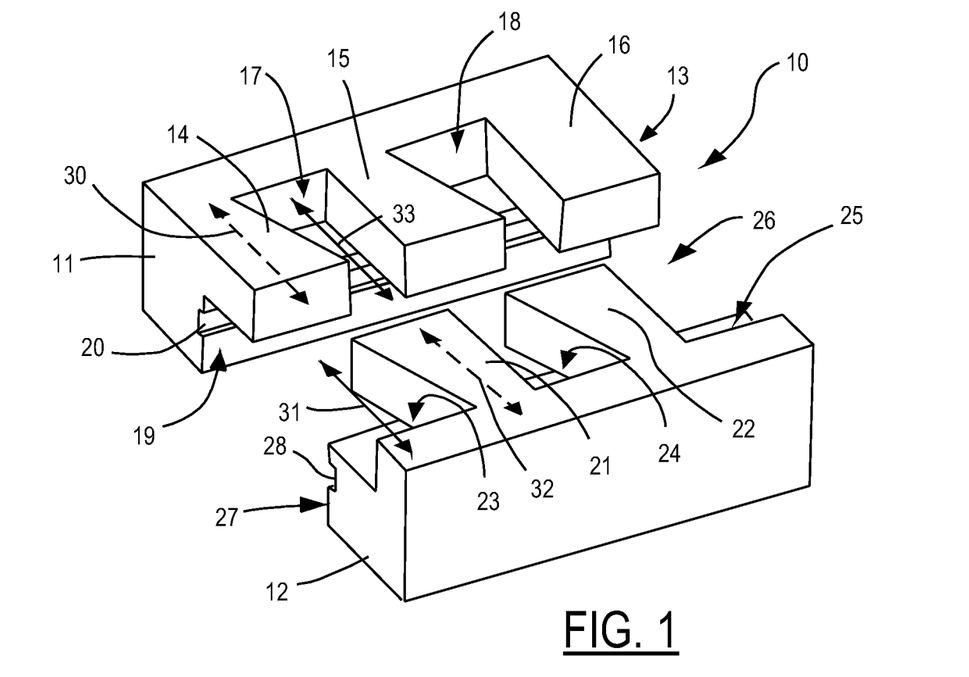
FIG. 1 is a perspective view showing an overlay component having first and second body sections prior to assembly.

Referring to FIG. 1, an overlay component 10 has a first body section 11 and a second body section 12. Each body section is comprised of a resilient material which can deform from its molded shape and then rebound to the original molded shape. First body section 11 has an interlocking portion 13 comprised of a plurality of projections 14-16 separated by a plurality of receptacles 17 and 18. First body section 11 also includes a structure receiving portion 19 which may include a groove 20 for accommodating an elongated structure such as a door check link.

Second body section 12 includes a plurality of projections 21 and 22 separated by a plurality of receptacles 23-25 in a second interlocking portion 26. Second body section 12 also includes a structure receiving portion 27 which may also include a groove 28.

Each projection from a body section has a corresponding, complementary-shaped receptacle on the body section. The complementary shapes are defined with respect to longitudinal axes such as an axis 30 of projection 14 and an axis 31 of receptacle 23 which are substantially parallel. Likewise, a longitudinal axis 32 of projection 21 is substantially parallel with longitudinal axis 33 of receptacle 17. Body sections 11 and 12 are shown in their interlocked condition in FIG. 2. In order to provide positive retention, the projections and receptacles preferably have a tapered shape so that once inserted the parts cannot come apart without deforming the projections.

Figure 2:
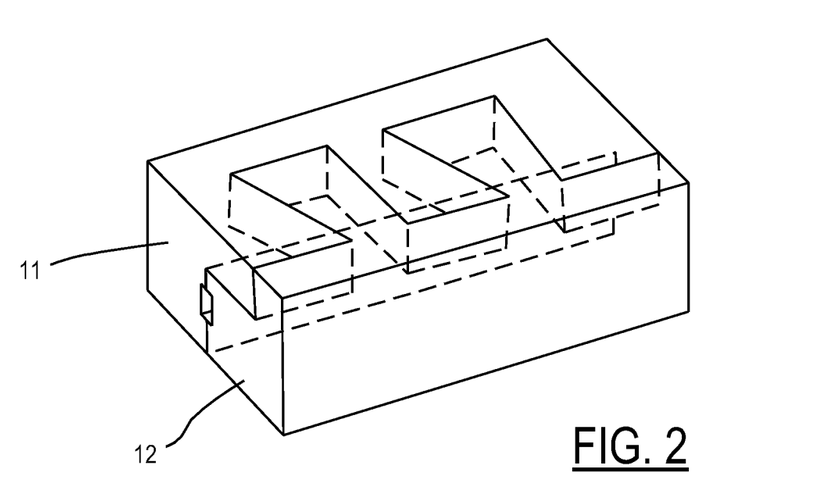
FIG. 2 shows the body sections of FIG. 1 after assembly.
Figure 3:
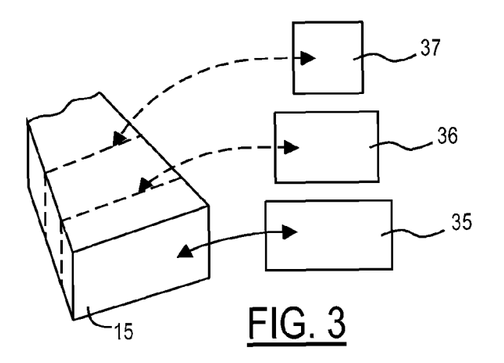
FIG. 3 shows a varying cross-sectional profile of a typical projection on the body sections of FIG. 1.

In the embodiment shown in FIGS. 1 and 2, each projection has a cross-sectional profile perpendicular to their longitudinal axis (e.g., axis 30 of projection 14) which is greater at a distal end of the projection (i.e., toward the other body section) than at a proximal end of the projection. The matching receptacle on the other body section has a complementary cross-sectional profile, which is lesser at its distal end and greater toward its proximal end to accept the matching projection in the manner of a jigsaw puzzle piece. FIG. 3 shows the changing cross-sectional profile of projection 15 in greater detail. A largest profile 35 is provided at the distal end of projection 15 (e.g., it has the greatest horizontal width of any cross section of the projection). A profile 36 having a lesser width corresponds to a position along the longitudinal axis of 15 just slightly removed from the distal end. An even narrower profile 37 corresponds to a position along projection 15 close to its proximal end.

Figure 4:
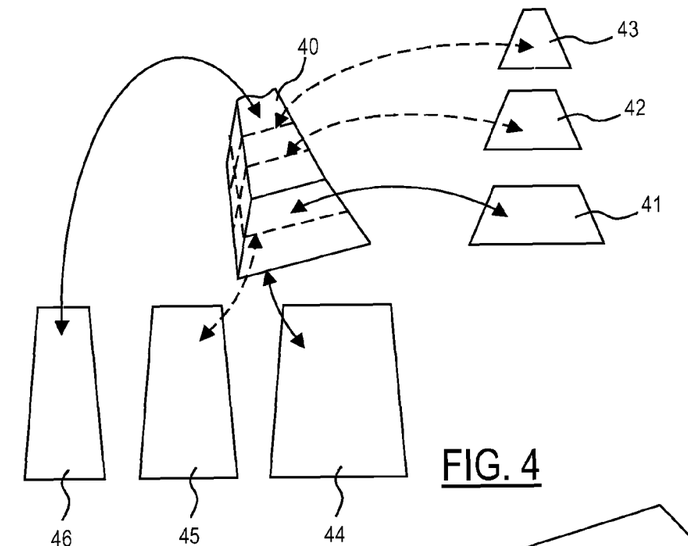
FIG. 4 shows a cross-sectional profile for a projection of an alternative embodiment.

Other shapes for the cross-sectional profile can be provided to increase retention along other directions of the interlocking pieces. Thus, a trapezoidally shaped profile can be used as shown in FIG. 4 (with the shape of the matching receptacle also being modified to have a complementary shape). A projection 40 has a cross-sectional profile that narrows in a horizontal plane moving from the bottom toward the top and in a vertical plane moving from the front or distal end to the rear or proximal end. Thus, a vertical profile taken perpendicular to a longitudinal axis of projection 40 has a progressively lesser width as shown at profiles 41-43. Likewise, a horizontal profile 44-46 has a gradually decreasing width moving from the bottom surface 44 to the top surface 46 of projection 40.

Figure 5:
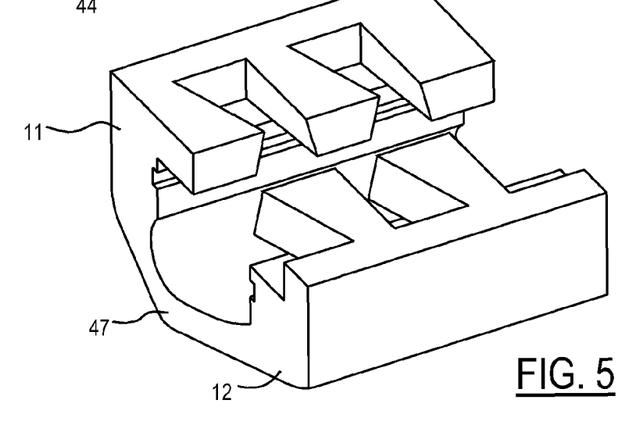
FIG. 5 is a perspective view showing an alternative embodiment including a living hinge.

FIG. 5 shows an overlay component using the cross-sectional profiles of FIG. 4 for the projections and a complementary cross-sectional profile for the corresponding receptacles or cavities. In addition, first body section 11 is joined to body section 12 via a living hinge 47 (shown in FIG. 5 with an exaggerated length) for retaining the lower faces of body section 11 and 12 together. Alternatively, interlocking matched sets of projections and receptacles can be provided on the lower interface (below grooves 20 and 28) between first and second body sections 11 and 12 instead of living hinge 47.

Figure 6:
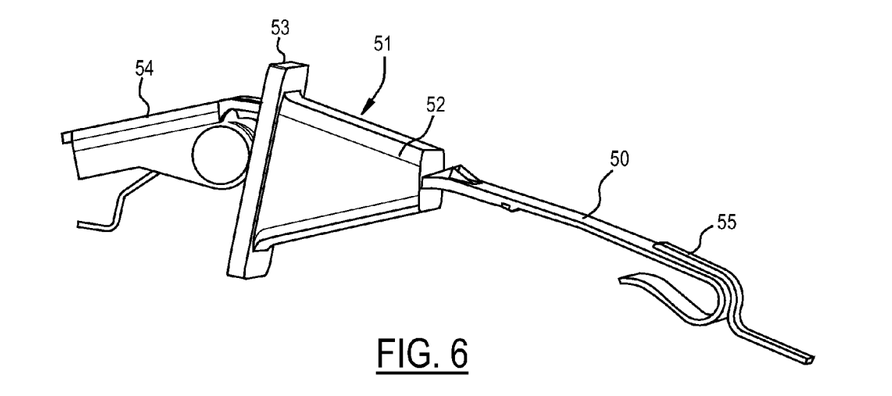
FIG. 6 is a perspective view of a door check link and seal according to one embodiment of the present invention.
Figure 7:
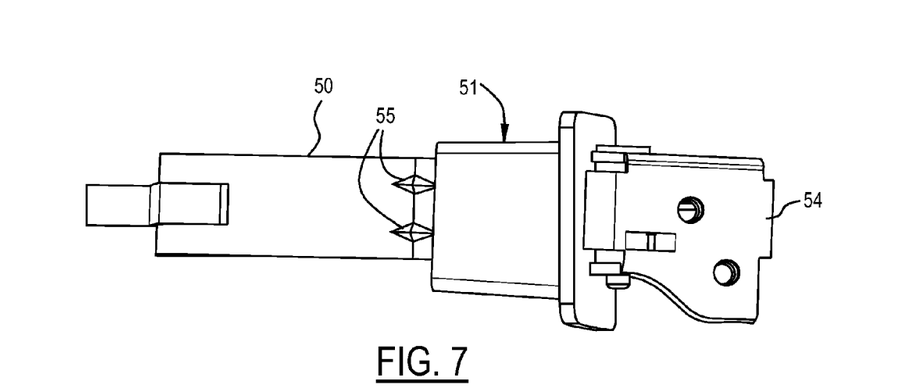
FIG. 7 is a front plan view of the door check link and seal of FIG. 6.
Figure 8:
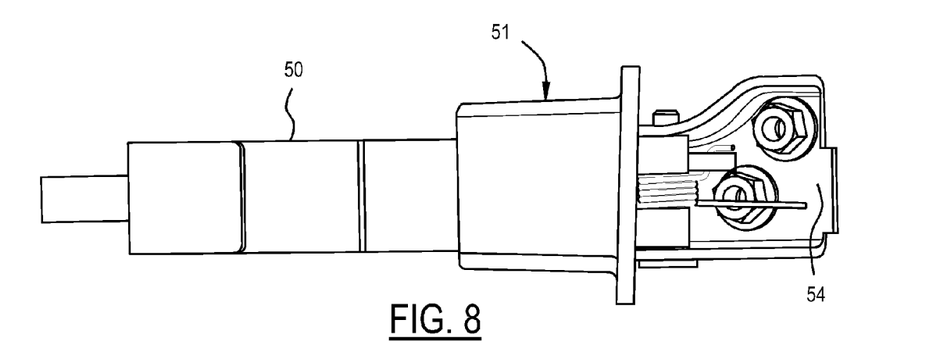
FIG. 8 is a rear plan view of the door check link and seal of FIG. 6.

Use of the present invention for a door check link is shown in FIG. 6. Thus, a check link assembly includes a link 50 receiving a seal 51 having a retaining portion 52 and a flange portion 53. Link 50 passes through retaining portion 52 to a hinge 54 that may be mounted to a door frame. An end clip 55 slidingly receives a detent structure in the interior of a door so that link 50 passes through a hole in the door. Check link 50 has its maximum penetration into the door when the door is closed. Retaining portion 52 is tapered to allow clearance to the hole in the door when the door is moved and to plug the hole in the door when the door is in the closed position, thereby sealing the hole. In addition, flange 53 interfaces with the hole when the door is closed thereby sealing the hole against environmental factors such as wind noise and preventing seal 51 from passing completely through the hole in the door. As shown by FIGS. 7 and 8, seal 51 remains close to hinge 54 even when the door is open. A pair of darts 55 or other features may be provided in order to help retain seal 51 and prevent any sliding movement along link 50.

Figure 9:
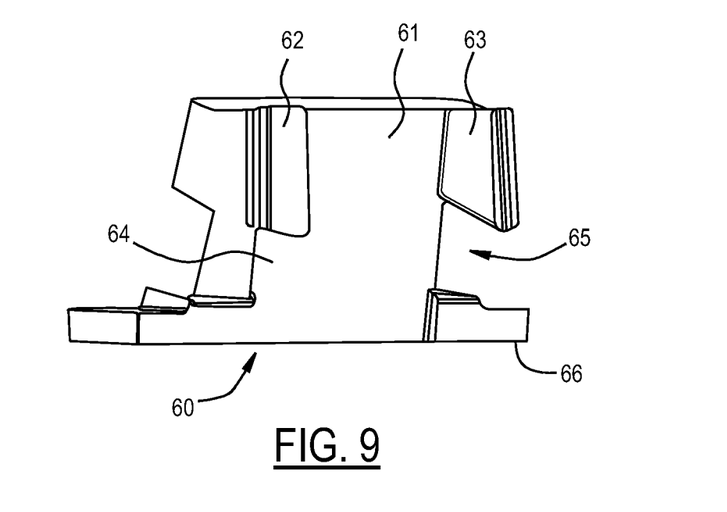
FIG. 9 is a perspective view of a first body section of an alternative embodiment.
Figure 10:
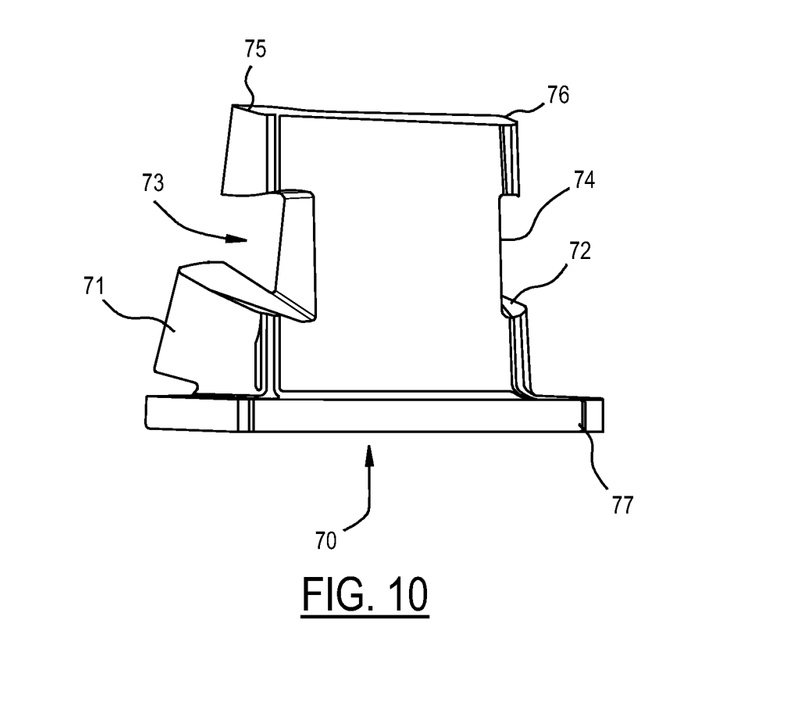
FIG. 10 is a perspective view of a second body section complementary to the body section of FIG. 9.

FIGS. 9 and 10 show one embodiment of the body sections for a door check link seal. In FIG. 9, a first body section 60 (seen from its interior side) includes a first check link receiving surface 61 and a pair of projections 62 and 63. Respective sides of projection 62 and 63 create corresponding sides of a pair of receptacles 64 and 65. A flange section 66 provides one respective half of a flange to cover a respective portion of the hole in the door. A second body section 70 is shown in FIG. 10 for interlocking with body section 60 of FIG. 9. FIG. 10 shows the outside surface of body section 70 which includes a first pair of projections 71 and 72 for interlocking with receptacles 64 and 65 which have a complementary profile. A pair of receptacles 73 and 74 receives projections 62 and 63 from first body section 60 and have a profile complementary thereto. A further pair of projections 75 and 76 extends toward first body section 60 thereby forming the other respective sides for receptacles 73 and 74. A flange portion 77 is coplanar with flange portions 66 and covers its respective portion of the hole in the door.

In order to obtain the interlocking configuration of the body sections, the projections must be made of a resilient, deformable material so that they can be compressed for insertion and they expand back to their original shape to resist separation. Many different resilient materials commonly used in manufacturing components for motor vehicles would be acceptable. A foamed material (i.e., a moldable base substance with an internal matrix of air bubbles), such as foam rubber, is preferred. An elastomeric foam such as reticulated polyurethane can preferably be used for a door check link seal.

Figure 11:
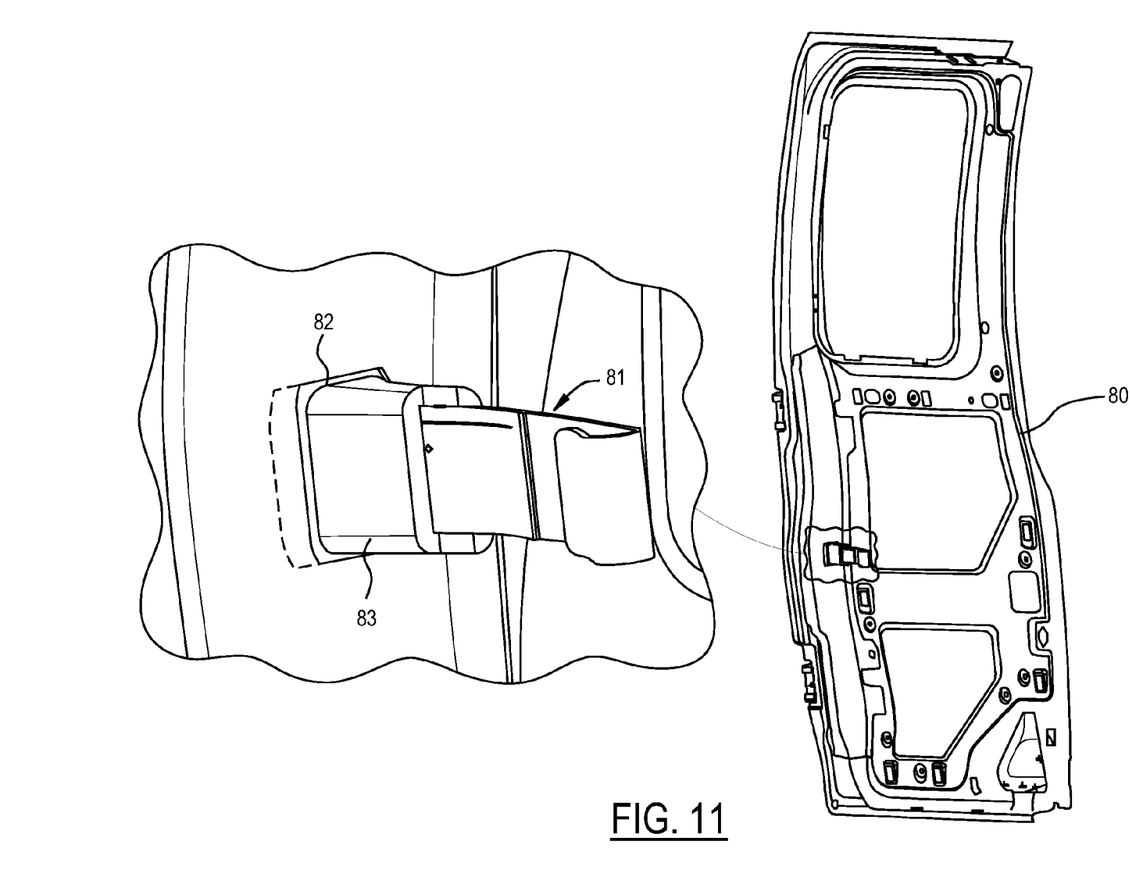
FIG. 11 is a perspective view showing another embodiment of a door check link and seal installed on a door member.

FIG. 11 illustrates a door check link in greater detail together with another embodiment of the seal. A door member 80 has an internal space into which a first end of a door check link 81 protrudes through a hole 82. A portion of a seal 83 likewise protrudes into the interior space of the door member to plug the hole 82 when the door is closed.

Figures 12, 13, 14:
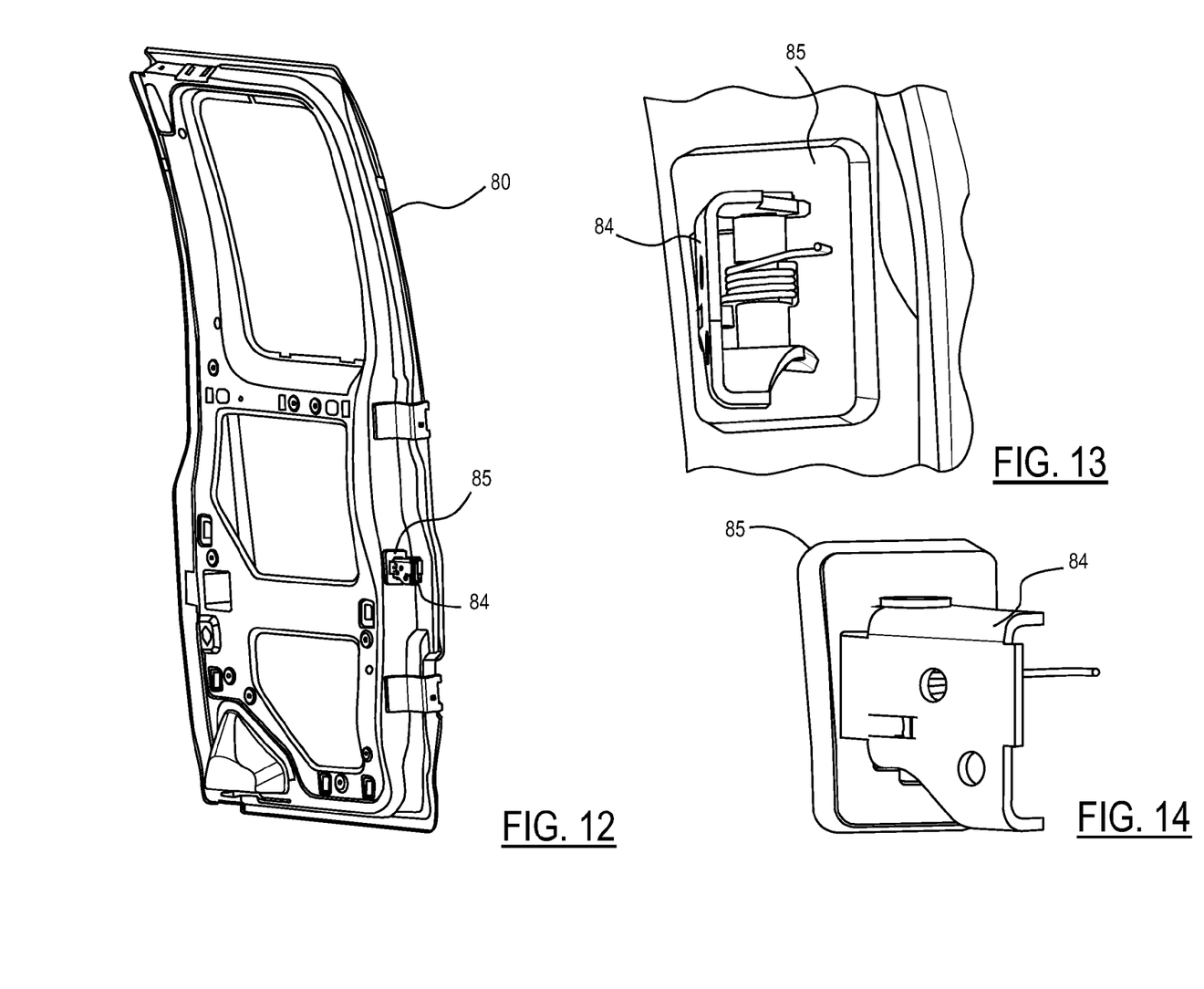
FIG. 12 is a perspective view showing a door member and the other side of the door check link and seal.
FIG. 13 shows the door check link of FIG. 12 with a hinge in a first position.
FIG. 14 shows the hinge of FIG. 13 in a second position.

FIG. 12 shows the side of door member 80 that extends toward the door frame. The check link is attached to a hinge 84 for attaching to the door frame. Seal 83 has a flange 85, which fills the door hole with the check link in the closed position as shown.

FIG. 13 is a close-up showing the position of hinge 84 with the door closed and flange 85 contacting the door. FIG. 14 shows the relative position of hinge 84 and flange 85 when the door is opened and no longer contacting flange 85.

Figure 15:
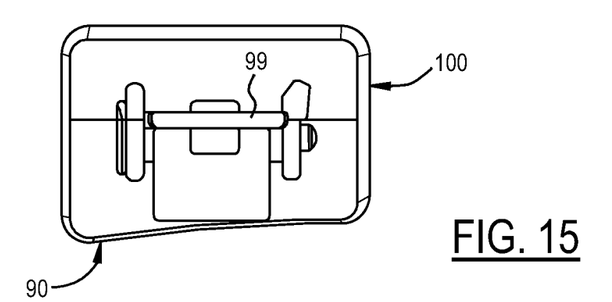
FIGS. 15-17 are bottom, front, and side views of an overlay seal for a door check link according to yet another embodiment.
Figure 16:
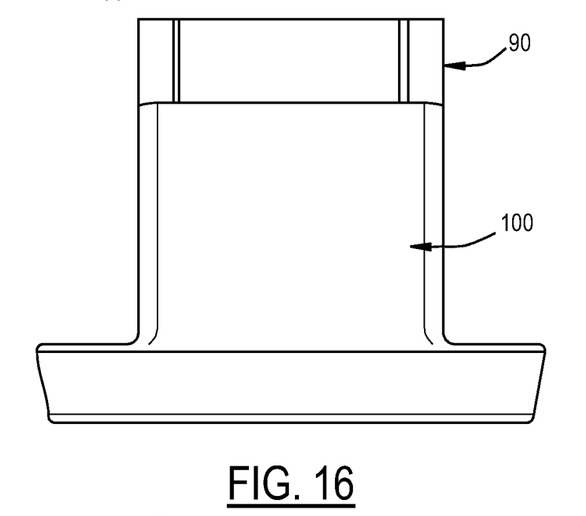
Figure 17:
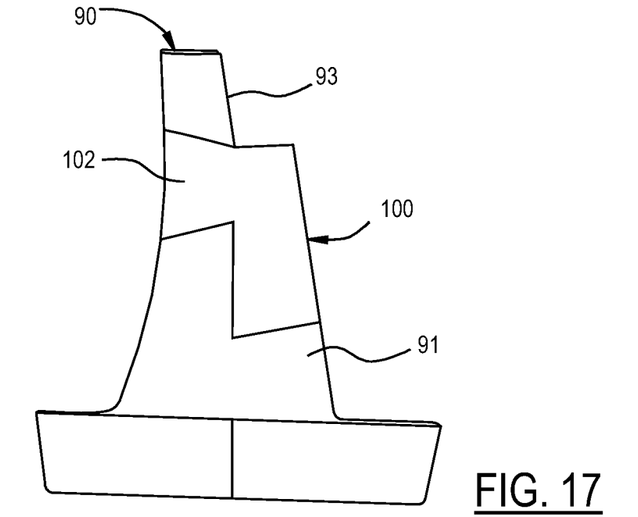
Figure 18:
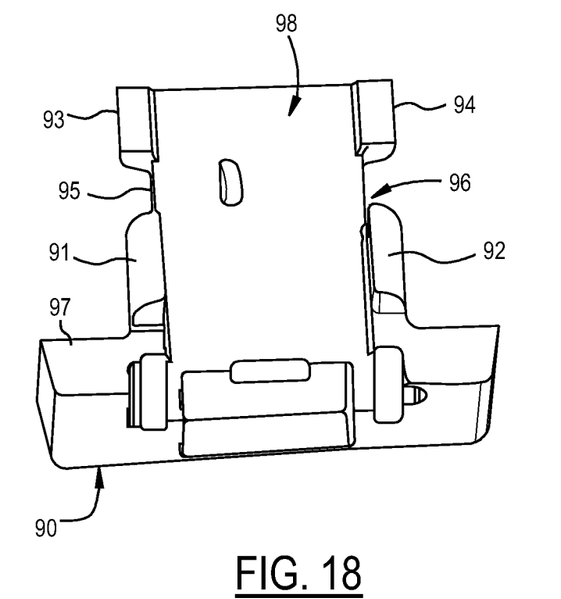
FIGS. 18 and 19 are inside and outside perspective views, respectively, of the first body section of the seal shown in FIGS. 15-17.
Figure 19:
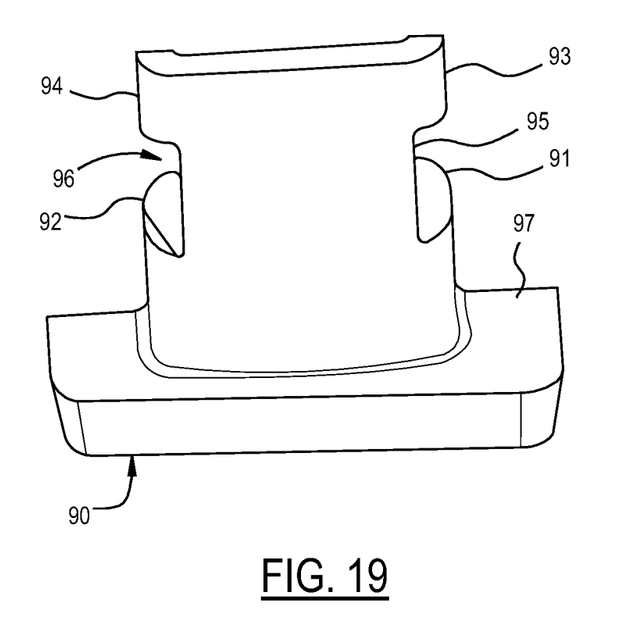

FIGS. 15-21 show seal 83 in greater detail. A first body section 90 includes projections or tabs 91-94 and receptacles or cavities 95 and 96. A half flange 97 extends from body section 90 and helps define a check link receiving portion 98 for producing a passageway 99 as best seen in FIG. 15.

Figure 20:
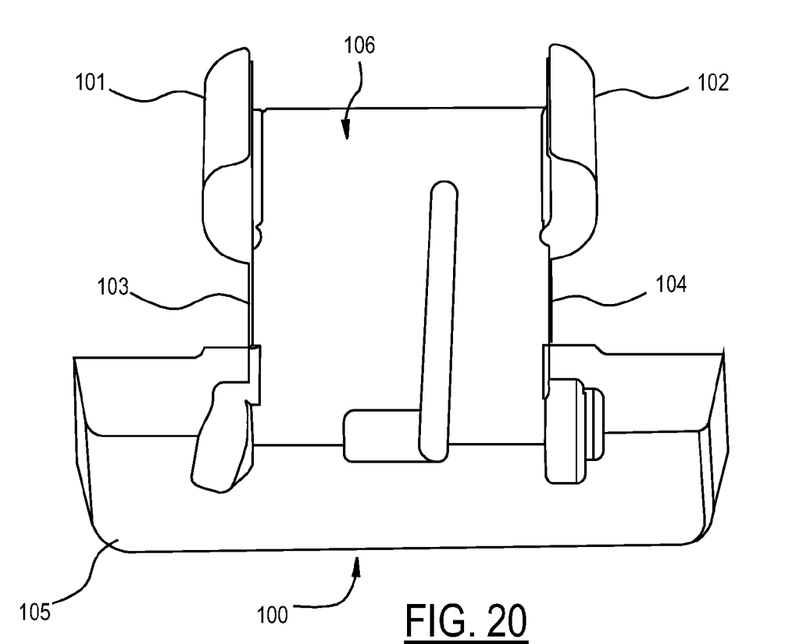
FIGS. 20 and 21 are inside and outside perspective views of the second body section of the seal of FIGS. 15-17.
Figure 21:
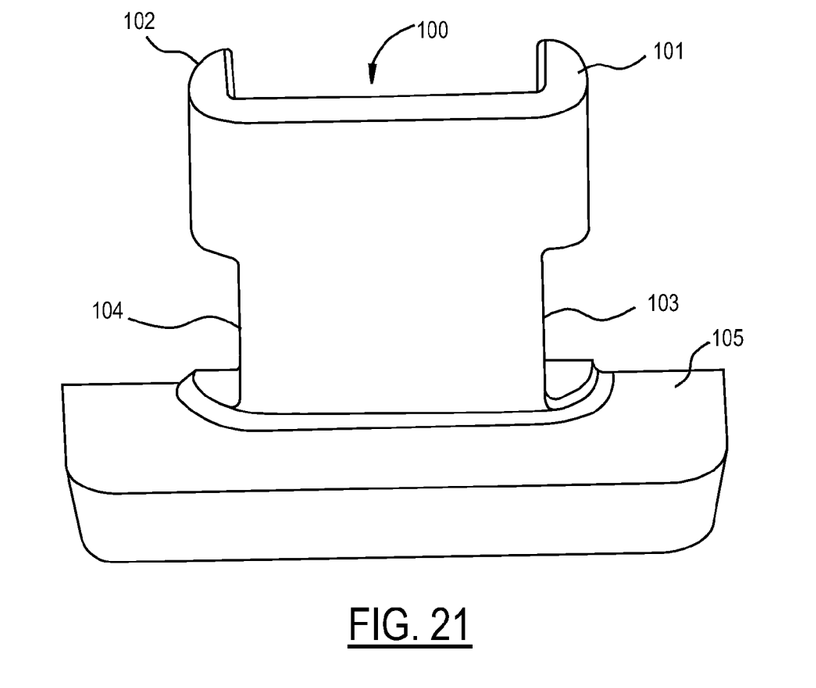

A second body portion 100 has a pair of projections 101 and 102 and a pair of receptacles 103 and 104. A half flange 105 is coplanar with half flange 97 when body sections 90 and 100 are interlocked. A check link receiving portion 106 cooperates with portion 98 in creating passageway 99. The projections and receptacles have complementary interlocking shapes that can be assembled by deforming the projections and then resiliently capturing them in the corresponding receptacles. Thus, any need for fasteners or adhesives to retain the applied parts is eliminated even though the applied parts cannot be installed over the ends of the existing parts. Therefore, parts cost is reduced while the manufacturing process and overall quality are improved.

While certain embodiments of the present invention have been described in detail, those familiar with the art to which this invention relates will recognize various alternative designs and embodiments for practicing the invention as defined by the following claims.

What is claimed is:

1. An overlay component for mounting to an elongated vehicle structure after assembly of the vehicle structure onto a vehicle such that it has no open accessible end, wherein the vehicle structure is subject to environmental conditions during or after assembly to the vehicle that would destroy the overlay component so that the overlay component cannot be mounted to the vehicle structure prior to its assemble onto the vehicle, the overlay component comprising:
   a first body section; and
   a second body section;
   wherein the first body section is comprised of a resilient material and has a first structure receiving portion and a first interlocking portion, wherein the first structure receiving portion is shaped to contain at least a portion of the elongated vehicle structure, wherein the first interlocking portion has a first projection extending along a first axis and a first receptacle extending along a second axis, wherein the first projection has a first cross-sectional profile perpendicular with the first axis which is greater at a distal end toward the second body section than at a proximal end, wherein the first receptacle has a second cross-sectional profile perpendicular with the second axis which is lesser at a distal end toward the second body section than at a proximal end, and wherein the first projection has a fifth cross-sectional profile parallel to the first axis that increases from one longitudinal side of the first projection to the other longitudinal side;
   wherein the second body section is comprised of a resilient material and has a second interlocking portion, the second interlocking portion having a second projection extending along the second axis and a second receptacle extending along the first axis, wherein the second projection has a third cross-sectional profile perpendicular with the second axis which is complementary with the second cross-sectional profile of the first receptacle, wherein the second receptacle has a fourth cross-sectional profile perpendicular with the first axis which is complementary with the first cross-sectional profile of the first projection, and wherein the second receptacle is complementary with the fifth cross-sectional profile; and
   wherein the first and second projections resiliently deform for insertion into the second and first receptacles, respectively, thereby closing the first structure receiving portion in a manner adapted to retain the overlay component on the elongated vehicle structure without adhesives or fasteners.

2. The overlay component of claim 1 wherein the resilient material of the first and second body sections comprises an elastomeric foam.

3. The overlay component of claim 2 wherein the elastomeric foam comprises reticulated polyurethane.

4. The overlay component of claim 1 wherein the resilient material of the first and second body sections comprises foam rubber.

5. The overlay component of claim 1 wherein the first and second projections each creates a respective side of the first and second receptacles.

6. The overlay component of claim 1 wherein the second body section includes a second structure receiving portion juxtaposed with the first structure receiving portion, and wherein the second structure receiving portion is shaped to contain at least a portion of the elongated vehicle structure.

7. The overlay component of claim 1 wherein the second axis is substantially parallel with the first axis.

8. The overlay component of claim 1 further comprising a living hinge coupling the first and second body sections.

9. A seal for mounting to a door check link after assembly of both ends of the door check link onto a vehicle and after passing of the vehicle through a paint oven that would destroy the seal, wherein the seal comprises:
   a first body section; and
   a second body section;
   wherein the first body section is comprised of a resilient material and has a first link receiving portion and a first interlocking portion, wherein the first link receiving portion is shaped to contain at least a portion of the door check link, wherein the first interlocking portion has a first projection extending along a first axis and a first receptacle extending along a second axis, wherein the first projection has a first cross-sectional profile perpendicular with the first axis which is greater at a distal end toward the second body section than at a proximal end, wherein the first receptacle has a second cross-sectional profile perpendicular with the second axis which is lesser at a distal end toward the second body section than at a proximal end, and wherein the first projection has a fifth cross-sectional profile parallel to the first axis that increases from one longitudinal side of the first projection to the other longitudinal side;
   wherein the second body section is comprised of a resilient material and has a second interlocking portion, the second interlocking portion having a second projection extending along the second axis and a second receptacle extending along the first axis, wherein the second projection has a third cross-sectional profile perpendicular with the second axis which is complementary with the second cross-sectional profile of the first receptacle, wherein the second receptacle has a fourth cross-sectional profile perpendicular with the first axis which is complementary with the first cross-sectional profile of the first projection, and wherein the second receptacle is complementary with the fifth cross-sectional profile; and
   wherein the first and second projections resiliently deform for insertion into the second and first receptacles, respectively, thereby closing the first link receiving portion in a manner adapted to retain the seal on the door check link without adhesives or fasteners.

10. The seal of claim 9 wherein the resilient material of the first and second body sections comprises an elastomeric foam.

11. The seal of claim 10 wherein the elastomeric foam comprises reticulated polyurethane.

12. The seal of claim 9 wherein the resilient material of the first and second body sections comprises foam rubber.

13. The seal of claim 9 wherein the first and second projections each creates a respective side of the first and second receptacles.

14. The seal of claim 9 wherein the second body section includes a second link receiving portion juxtaposed with the first link receiving portion, and wherein the second link receiving portion is shaped to contain at least a portion of the door check link.

15. The seal of claim 9 wherein the second axis is substantially parallel with the first axis.

16. The seal of claim 9 further comprising a living hinge coupling the first and second body sections.

\* \* \* \* \*